United States Patent [19]

Ohzono et al.

[11] Patent Number: 4,673,379

[45] Date of Patent: Jun. 16, 1987

[54] INFINITELY VARIABLE TRANSMISSION

[75] Inventors: Kohei Ohzono, Saitama; Mitsuru Saito, Tokyo; Kiyotaka Hayashi; Taiji Fujita, both of Saitama, all of Japan

[73] Assignee: Honda Giken Kogyo Kabushiki Kaisha, Tokyo, Japan

[21] Appl. No.: 780,118

[22] Filed: Sep. 25, 1985

[30] Foreign Application Priority Data

| | | | |
|---|---|---|---|
| Sep. 26, 1984 | [JP] | Japan | 59-201198 |
| Nov. 1, 1984 | [JP] | Japan | 59-230631 |
| Nov. 5, 1984 | [JP] | Japan | 59-166424 |
| Dec. 20, 1984 | [JP] | Japan | 59-267507 |

[51] Int. Cl.[4] .............. F16H 11/04

[52] U.S. Cl. .............. 474/28

[58] Field of Search .............. 474/28, 11, 12, 16–18, 474/69, 70

[56] References Cited

U.S. PATENT DOCUMENTS

| | | | |
|---|---|---|---|
| 3,600,961 | 8/1971 | Rattunde | 474/28 X |
| 4,152,947 | 5/1979 | van Deursen et al. | 474/11 |
| 4,400,164 | 8/1983 | Capee | 474/28 X |
| 4,455,888 | 6/1984 | Wayman et al. | 74/689 |
| 4,475,416 | 10/1984 | Underwood | 474/28 X |
| 4,484,901 | 11/1984 | Toti et al. | 474/28 |
| 4,494,943 | 1/1985 | Takei et al. | 474/28 |
| 4,560,369 | 12/1985 | Hattori | 474/28 |

*Primary Examiner*—Stephen J. Novosad

*Assistant Examiner*—Thuy M. Bui

*Attorney, Agent, or Firm*—Armstrong, Nikaido, Marmelstein & Kubovcik

[57] ABSTRACT

An infinitely variable transmission includes a driver shaft having a driver pulley, a driven shaft having a driven pulley, the driver and driven pulleys having fixed conical discs and movable conical discs, the movable conical discs having pressure chambers, an endless belt trained around said driver and driven pulleys, a device for supplying a fluid under pressure to the pressure chambers, a pressure regulating mechanism for regulating the fluid pressure at a prescribed pressure, and a fluid metering mechanism for regulating the amount of the fluid under the prescribed pressure in the pressure chambers. At least one of the pressure regulating mechanism and the fluid metering mechanism is disposed in the driver shaft or the driven shaft. The pressure regulating mechanism is arranged to discharge an excess amount of the fluid to a lower-pressure area when the supplied fluid pressure exceeds a prescribed level and also has passages for supplying the discharged amount of the fluid as lubricating oil to the endless belt. The fixed conical discs of the driver and driven pulleys are disposed on opposite sides of the endless belt. The fixed conical discs are arranged such that the central axis of the endless belt is inclined with respect to a line normal to pulley axes at an angle which is substantially zero at a power transmission speed ratio which is most frequently be used between the driver and driven pulleys.

7 Claims, 12 Drawing Figures

INFINITELY VARIABLE TRANSMISSION

BACKGROUND OF THE INVENTION

The present invention relates to a transmission, and more particularly to an infinitely variable transmission having an endless belt trained around driver and driven pulleys.

U.S. Pat. No. 4,152,945 patented on May 8, 1979 discloses an infinitely varible transmission comprising driver and driven pulleys each having its groove width variable axially by a hydraulic actuator, an endless belt of metal trained around the pulleys, a hydraulic pressure supply device for supplying a fluid pressure to the hydraulic actuators, and a device for controlling the supply and discharge of the fluid pressure to and from the hydraulic actuators, the transmission ratio of the belt being variable by varying the groove width of the pulleys.

The disclosed infinitely variable transmission is necessarily large in overall size since the device for controlling the fluid supply and discharge is disposed separately from the driver and driven pulleys. A pitot tube is disposed in a fluid groove positioned outside of a fluid pressure chamber defined behind a movable pulley cone for detecting the fluid pressure in the fluid groove. The fluid pressure on the movable pulley cone is controlled by the fluid pressure detected by the pitot tube. The use of the pitot tube makes the pipe system complex and makes it difficult for the transmission to be designed in its layout. Since the endless belt is made of metal, it must be lubricated. To this end, the fluid in the high-pressure fluid line which feeds the hydraulic actuators is partly supplied as the lublicating oil directly to the endless belt. Therefore, the hydraulic pressure pump is subject to an extra load which is required to compensate for the loss of the fluid pressure arising from the supply of the fluid pressure to the endless belt.

In the disclosed infinitely variable transmission, the deviation of the endless belt from the central line is zero at a low transmission ratio. When the transmission ratio is frequently varied between high and low ratios, the metal belt which is of high transverse rigidity suffers an undue force tending to shorten the service life of the endless belt.

The present invention has been made in an effort to solve the aforesaid problems of the conventional infinitely variable transmission.

SUMMARY OF THE INVENTION

It is an object of the present invention to provide an infinitely variable transmission which has reduced outer dimensions, is simple in construction, easy in designing its layout, and can be manufactured at a low cost.

Another object of the present invention is to provide an infinitely variable transmission in which the endless belt of metal can be supplied with lubricating oil without imposing an excessive load on the fluid supply pump.

Still another object of the present invention is to provide an infinitely variable transmission in which the endless belt can uniformly, but not locally, be worn as the power transmission ratio varies, so that the endless belt can be in service for a long period of time.

According to the present invention, the above objects can be achieved by an infinitely variable transmission comprising a driver shaft drivable by a drive source, a driven shaft drivable by power transmitted from the driver shaft, driver and driven pulleys mounted respectively on the driver and driven shafts, each of the driver and driven pulleys comprising a fixed conical disc fixed to one of the driver and driven shafts and a movable conical disc mounted axially slidably on said one of the driver and driven shafts, the fixed and movable conical discs jointly defining a V-shaped groove, the movable conical disc having a pressure chamber therebehind which has a volume variable under a fluid pressure for moving the movable conical disc, an endless belt trained around the driver and driven pulleys and engaging in the V-shaped grooves, means for supplying a fluid under pressure to the pressure chamber, a pressure regulating mechanism for regulating the fluid pressure at a prescribed pressure, and a fluid metering mechanism for regulating the amount of the fluid under the prescribed pressure in the pressure chamber, at least one of the pressure regulating mechanism and the fluid metering mechanism being disposed in one of the driver and driven shafts.

The pressure regulating mechanism has means for discharging an excess amount of the fluid to a lower-pressure area when the supplied fluid pressure exceeds a prescribed level and also having a passage for supplying the discharged amount of the fluid as lubricating oil to the endless belt.

The fixed conical discs of the driver and driven pulleys are disposed on opposite sides of the endless belt and arranged such that the central axis of the endless belt is inclined with respect to a line normal to the rotatable shaft at an angle which is substantially zero at a power transmission speed ratio which is most frequently be used between the driver and driven pulleys.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
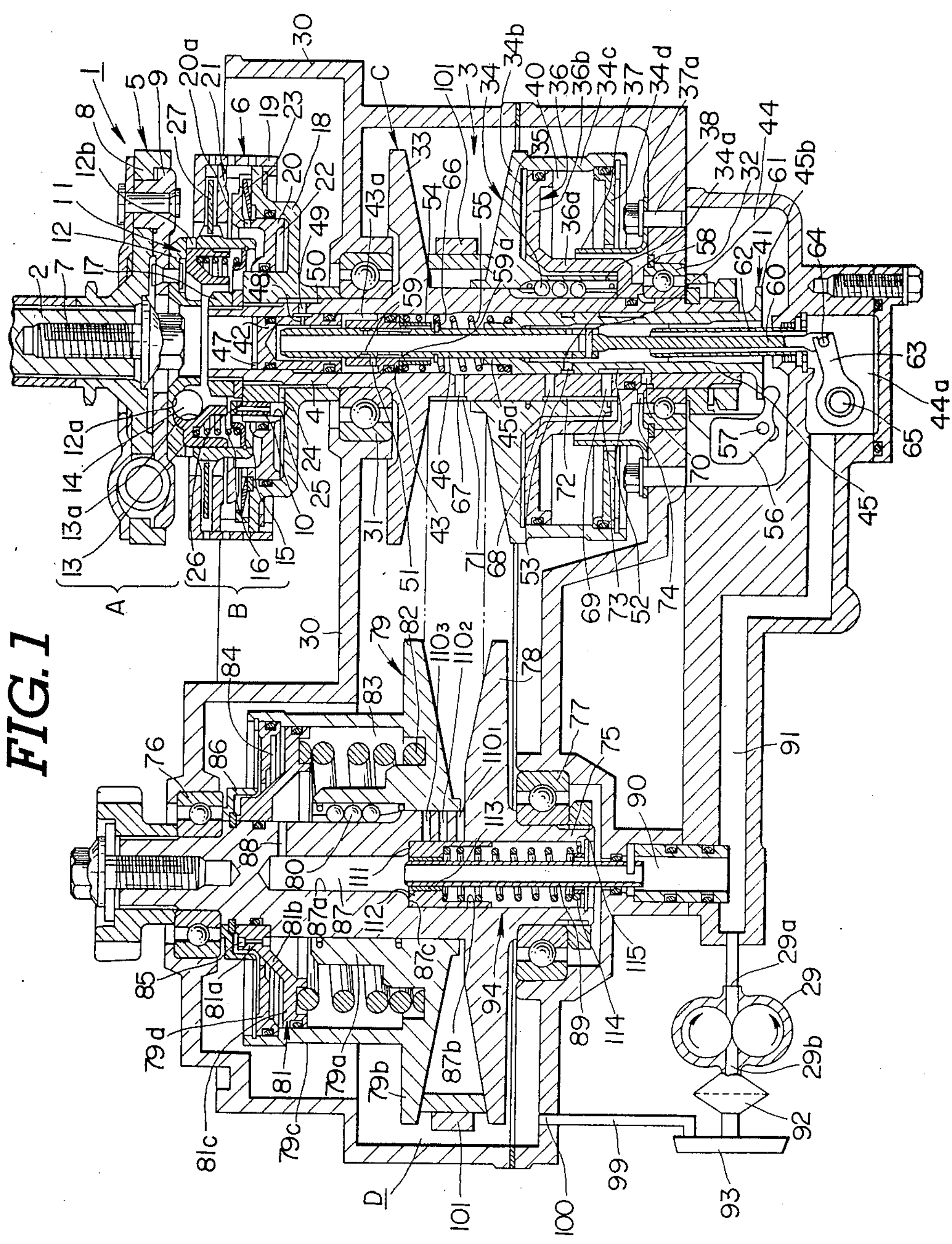
FIG. 1 is a cross-sectional view of an infinitely variable transmission according to a first embodiment of the present invention.

FIG. 1 shows an infinitely variable transmission according to a first embodiment of the present invention. A starting clutch 1 is interposed between an input shaft 2 coupled to the output shaft of an internal combustion engine (not shown) and a driver shaft (rotatable shaft) 4 of an automatic infinitely variable transmission 3. The starting clutch 1 includes an input rotatable member 5 rotatable in unison with the input shaft 2 and an output rotatable member 6 rotatable in unison with the driver shaft 4.

The input rotatable member 5 comprises a disc 8 splined to the input shaft 2 and fixed thereto by a bolt 7, with a clutch damper mechanism 9 of a known structure being mounted on the disc 8. A control mechanism 11 for controlling a pressure-regulating valve 10 (described later) is mounted on the surface of the input rotatable member 5 which faces the output rotatable member 6. The control mechanism 11 comprises a governor mechanism having a cam plate 13 axially slidable fitted in a governor housing 12 riveted to the input rotatable member 5, and a governor ball 14 positioned between the cam surface 13*a* of the cam plate 13 and the guide surface 12*a* of the governor housing 12 for radial sliding movement. The cam plate 13 is normally urged toward the input rotatable member 5 by a coil spring 16 interposed between the cam plate 13 and a spring seat 15. When the r.p.m. of the input shaft 2 is smaller than a preset value, the governor ball 14 is located radially centrally and the cam plate 13 is forced by the coil spring 16 toward the input rotatable member 5. When the r.p.m. of the input shaft 2 is increased higher than the preset value, then the governor ball 14 is displaced radially outwardly under centrifugal forces to move the cam plate 13 toward the output rotatable member 6 against the resiliency of the coil spring 16.

The output rotatable member 6 is composed of a clutch cylinder 18 splined to the driver shaft 4 and fixed thereto by a nut 17, and a clutch outer member 19 fixed to the outer periphery of the clutch cylinder 18 against circumferential and axial movement. A clutch piston (presser) 20 is axially slidably fitted in the clutch cylinder 18. The clutch piston 20 is operated by a fluid (oil) under pressure introduced into a pressure chamber 22 defined between the clutch piston 20 and the clutch cylinder 18 for pressing a friction plate 21 (described later). The clutch piston 20 is normally urged by a belleville spring 23 to move toward the output rotatable member 6.

The pressure chamber 22 is supplied with the fluid under pressure through a supply port 24 defined radially in the boss of the clutch cylinder 18. The fluid under pressure in the pressure chamber 22 can be discharged through the pressure-regulating valve 10 slidably fitted in a hole (discharge outlet of the pressure chamber) 25 defined axially through the boss of the clutch piston 20. The hole 25 has one end communicating with the supply port 24 and the opposite end opening at the end surface of the boss of the clutch cylinder 18 which is directed toward the input rotatable member 5. The pressure-regulating valve 10 is slidable a prescribed stroke in a direction along the axis of the driver shaft 4. The pressure-regulating valve 10 comprises a hollow pipe having open and closed ends opposite to each other and including a discharge port 26 extending radially through the peripheral side wall thereof adjacent to the closed end.

When the r.p.m. of the input shaft 2 is lower than the preset value, the pressure-regulating valve 10 is displaced toward the input rotatable member 5 under the fluid supplied under pressure from the supply port 24 thereby to open the discharge port 26. Since the fluid under pressure is discharged from the pressure chamber 22 through the discharge port 26, the pressure in the pressure chamber 22 is not increased and the clutch piston 20 remains displaced toward the output rotatable member 6 under the resiliency of the spring 23. When the r.p.m. of the input shaft 2 is higher than the preset value, the pressure-regulating valve 10 is pushed by the cam plate 13 toward the output rotatable member 6 thereby to close the discharge port 26. The pressure in the pressure chamber 22 is regulated by the ratio between the opening of the discharge port 26 and the opening of an orifice 48 (described later).

The friction plate 21 pushed by the clutch piston 20 is positioned between the input and output rotatable members 5, 6 and fitted axially movably but nonrotatably in the inner peripheral surface of the clutch outer member 19. Between the friction plate 21 and the end wall of the clutch outer member 19 which faces the input rotatable member 5, there is disposed a clutch facing 27 fitted nonrotatably but axially movably over the outer peripheral surface of the governor housing 12. By causing the clutch piston 20 to press the friction plate 21 and the clutch facing 27 against the clutch outer member 19, the input and output rotatable members 5, 6 are coupled to power transmission therethrough. When the friction plate 21 and the clutch facing 27 are released, no power can be transmitted through the input and output rotatable members 5, 6 which are now disconnected from each other.

The governor housing 12 and the clutch piston 20 have fluid distribution holes 12*b*, 20*a*, respectively, defined in their peripheral walls at prescribed positions. The fluid supplied under pressure from the discharge port 26 of the pressure-regulating valve 10 into the governor housing 12 and the space between the governor housing 12 and the clutch piston 20 is guided through the fluid distributing holes 12*b*, 20*a* to the sliding sufaces of the clutch facing 27. Therefore, the clutch facing 27 is prevented from being damaged by heat when the starting clutch 1 is partly connected.

The supply port 24 is connected to a pump (fluid pressure supply means) 29 through a directional control valve mechanism (fluid metering mechanism) incorporated in the automatic infinitely variable transmission 3.

The input shaft 2, the input rotatable member 5 (the disc 8), the bolt 7, the clutch damper mechanism 9, the control mechanism 11 (the governor housing 12, the cam plate 13, the governor ball 14, the spring seat 15, and the spring 16) jointly constitute an input assembly A. The driver shaft 4, the output rotatable member 6 (the clutch cylinder 18 and the clutch outer member 19), the pressure-regulating valve 10, the clutch piston 20, the friction plate 21, the spring 23, and the clutch facing 27 jointly constitute an output assembly B. For assembling the starting clutch 1, the assemblies A, B are first assembled independently, and then they are fitted together with the clutch facing 27 and the governor housing 12 being centrally aligned with each other.

Therefore, the starting clutch 1 can efficiently be assembled.

The driver shaft 4 comprises a hollow pipe with opposite open ends rotatably supported by ball bearings 31, 32 on side walls of a transmission box 30 at one end thereof. A driver pulley C with its groove width axially variable under the control of a fluid pressure is mounted on the driver shaft 4.

The driver pulley C comprises a fixed conical disc 33 integral with the outer periphery of the driver shaft 4 closely to the starting clutch 1, and a movable conical disc 34 disposed on the driver shaft 4 in axially confronting relation to the fixed conical disc 33 to define a V-shaped groove therebetween, the movable conical disc 34 being axially slidably but nonrotatably fitted over the driver shaft 4 through a plurality of balls 35 interposed therebetween. The movable conical disc 34 comprises a cylindrical boss **34*a* and a conical disc body 34*b* integrally disposed around an end of the boss 34*a*. The conical disc body 34*b* has a cylindrical wall 34*c* integrally projecting axially from the outer peripheral edge thereof in the direction axiall away from the fixed conical disc 33, and an annular closure plate 34*d* fitted in the cylindrical wall 34*c* at its projecting end. Thus, the movable conical disc 34** is in the form of a hollow drum.

In the movable conical disc 34, there is disposed a fixed piston 36 composed of a cylindrical body **36*a* having a central hole defined in one end wall thereof and an opposite open end, and an annular flange 36*b* projecting radially outwardly from the opposite open end of the cylindrical body 36*a*. The fixed piston 36 is nonrotatably but axially movably fitted over the driver shaft 4 extending through the central hole in its end wall. The cylindrical body 36*a* is loosely fitted over the boss 34*a* of the movable conical disc 34. The flange 36*b* is slidably fitted in the cylindrical wall 34*c* of the movable conical disc 34 in a fluidtight manner. A cylindrical guide tube 37 with its opposite ends open is fitted in the central hole of the annular closure plate 34*d* and over the cylindrical body 36*a* of the fixed piston 36. The guide tube 37 has an attachment flange 37*a* extending radially outwardly from one end thereof and fixed by bolts 38 to the inner surface of the side wall of the transmission box 30**.

A first pressure chamber 39 is defined between the conical disc body **34*b* of the movable conical disc 34 and the flange 36*b* of the fixed piston 36. A second pressure chamber 40 is defined between the closure plate 34*d* of the movable conical disc 34 and the flange 36*b* of the movable conical disc 34. The first and second pressure chambers 39, 40 are connected to the pump 29 through the directional control valve mechanism 41**.

The directional control valve mechanism 41 has a cylindrical bearing body 42 fixedly fitted in the end of the driver shaft 4 which is located in the starting clutch 1, a first valve 43 positioned adjacent to the cylindrical bearing body 42 remotely from the starting clutch 1 and fitted in the driver shaft 4 for axial movement through a prescribed stroke, a second valve 45 having one end facing the first valve 43 and the opposite end extending into a governor chamber 44 defined outside of the side wall of the transmission box 30, the second valve 45 being fitted in the driver shaft 4 for axial movement through a prescribed stroke, and a third valve 46 slidably fitted in the cylindrical bearing body 42, the first valve 43, and the second valve 45.

The cylindrical bearing body 42 is in the form of a hollow short bottomed cylinder having one end open. The cylindrical bearing body 42 is positioned by a stop ring 47 and fitted in the driver shaft 4 in a fluidtight manner. The cylindrical bearing body 42 has an orifice 48 defined radially through a peripheral side wall thereof. The orifice 48 is held in communication with the supply port 24 of the pressure chamber 22 in the starting clutch 1 through a first port 49 defined radially through a peripheral side wall of the driver shaft 4 and an annular groove 50 defined between the outer peripheral surface of the driver shaft 4 and the inner peripheral surface of the boss of the clutch cylinder 18 of the starting clutch 1.

The first valve 43 is in the form of a hollow short cylinder having opposite ends open and a larger-diameter portion on one end thereof. The larger-diameter portion of the first valve 43 is slidably fitted in the driver shaft 4 in a fluidtight fashion. There is a pressure chamber **43*a* defined between the outer peripheral surface of the smaller-diameter portion of the first valve 43 and the inner peripheral surface of the drive shaft 4. The first valve 43 has a port 51 defined radially through a peripheral side wall of the smaller-diameter portion thereof, the port 51 communicating with the pressure chamber 43*a***.

The second valve 45 comprises a hollow long cylinder having opposite ends open. The second valve 45 has an annular groove 52 defined in the outer peripheral surface of an axially intermediate portion thereof and extending over a prescribed axial length, and a port 53 defined radially therethrough and spaced axially from annular groove 52 toward the first valve 43. The second valve 45 has a smaller-diameter spring retainer **45*a* on its end closer to the first valve 43. A coil spring 55 is interposed axially between the spring retainer 45*a* and a spring retainer/stopper abutment 54 fitted over the end of the first valve 43 which is closer to the second valve 45. The first valve 43 is normally urged by the coil spring 55 toward the starting clutch 1, and the second valve 45 is normally urged by the coil spring 55 away from the starting clutch 1. A larger-diameter flange 45*b* integrally extends radially outwardly from the end of the second valve 45 which projects into the governor chamber 44, and is held against a governor weight 56. As the engine r.p.m. increases, the governor weight 56 is turned counter-clockwise (FIG. 1) about a shaft 57 to move the second valve 45 toward the starting clutch 1 against the resiliency of the coil spring 55**.

The third valve 46 is in the form of a hollow long cylinder having an open end closer to the starting clutch 1 and an opposite closed end. As described above, the third valve 46 is slidably fitted in the cylindrical bearing body 42, the first valve 43, and the second valve 45 in a fluidtight manner. The third valve 46 has a first port 58 defined radially through a peripheral side wall of the end thereof remote from the starting clutch 1, a second port 59 defined radially through a peripheral side wall thereof closer to the starting clutch 1, and an annular groove **59*a* defined in a peripheral side wall thereof closer to the starting clutch 1. The port 51 of the first valve 43 can communicate selectively with the second port 59 or the annular groove 59*a***.

One end of a rod 60 is pivotally coupled by a pin 61 to the end of the third valve 46 remote from the starting clutch 1. The rod 60 extends loosely through a fluid conduit pipe 62 having opposite ends open. The other end of the rod 60 extends out of the fluid conduit pipe 62 and is pivotally coupled by a pin 64 to an accelerator-controlled fork 63. One of the open ends of the fluid conduit pipe 62 is fixed to the outer side wall of the governor chamber 44, whereas the other open end of the fluid conduit pipe 62 is slidably fitted in the second valve 45 in a fluidtight manner. The accelerator-controlled fork 63 is disposed in a control fork chamber 44*a* defined outside of the governor chamber 44, and is angularly movable about a shaft 65 in response to the movement of a throttle valve (not shown). When the throttle valve is progressively opened, the accelerator-controlled fork 63 is turned clockwise to move the third valve 46 away from the starting clutch 1. The control fork chamber 44*a* is held in communication with the interior of the second valve 45 through the fluid conduit pipe 62. A ring-shaped stopper 66 is disposed around the outer peripheral wall surface of the third valve 46. Any delay for the first valve 43 to follow the quick closing of the throttle valve can be prevented by engagement of the spring retainer/stopper abutment 54 with the stopper 66.

The driver shaft 4 has third, second, fourth, and fifth ports 67, 68, 69, 70 defined radially in peripheral side walls thereof and positioned in axially spaced relation in the order named from an axial intermediate portion thereof away from the starting clutch 1. When the groove width of the driver pulley C is maximal, i.e., when the movable conical disc 34 is spaced a largest distance from the fixed conical disc 33, the second port 67 is postioned substantially midway between the conical discs 33, 34 and opens into the transmission box 30. When the groove width of the driver pulley C is minimal, i.e., when the movable conical disc 34 is spaced a smallest distance from the fixed conical disc 33, the open end of the second port 67 is closed by the boss of the movable conical disc 34. However, the second port 67 is kept in communication with the interior of the transmission box 30 through a recess 71 defined in an outer periphery of the driver shaft 4. When the groove width of the driver pulley is at maximum, the third port 68 is positioned substantially at an axially intermediate portion of the boss of the movable conical disc 34. When the groove width of the driver pulley C is at minimum, the third port 68 is positioned at the end of the boss of the movable conical disc 34 remote from the starting clutch 1.

The radially outer open ends of the third and fourth ports 68, 69 are held in communication with the first pressure chamber 39 through an annular groove 72 defined between the outer peripheral surface of the driver shaft 4 and the inner peripheral surface of the boss of the movable conical disc 34 and also through a clearance between the end face of the boss 34*a* of the movable conical disc 34 and the inner end face of the cylindrical body 36*a* of the fixed piston 36. The end face of the boss 34*a* of the movable conical disc 34 has a recess 73 for providing communication between the annular groove 72 and the first pressure chamber 39 when the groove width of the driver pulley C is maximum, i.e., when the end face of the boss 34*a* is held against the inner end face of the cylindrical body 36*a*. The third port 68 can communicate with the port 53 of the second valve 45. The fifth port 70 is positioned between the outer end face of the cylindrical body 36*a* of the fixed piston 36 and the ball bearing 32. The fifth port 70 is held in communication with the second pressure chamber 40 through a recess 74 defined in the central boss on the outer end face of the cylindrical body 36*a* and also through the guide tube 37. The fourth port 69 and the fifth port 70 communicate with each other through the annular groove 52 on the outer peripheral wall surface of the second valve 45.

A driven pulley D incorporating a mechanism 94 for controlling the fluid pressure on a movable conical disc and regulating the fluid pressure is disposed in the transmission box 30 on the other end thereof opposite to the driver pulley C. A driven shaft 75 is rotatably supported at its opposite ends on the opposite side walls of the transmission box 30 at the other end thereof by means of ball bearings 76, 77. The driven pulley D with its groove width variable under fluid pressure control is mounted on the driven shaft 75 in the transmission box 30. The driven pulley D comprises a fixed conical disc 78 integral with the outer periphery of the driven shaft 75, and a movable conical disc 79 disposed on the driven shaft 75 in axially confronting relation to the fixed conical disc 78 with a V-shaped groove defined therebetween, the movable conical disc 79 being axially slidably but nonrotatably fitted over the driven shaft 75 through a plurality of balls 80 interposed therebetween.

The movable conical disc 79 is composed of a cylindrial boss 79*a* and a disc-shaped conical disc body 79*b* integrally projecting radially outwardly from one end of the boss 79*a*. The conical disc body 79*b* is in the form of a drum having a cylindrical wall 79*c* projecting axially from a substantially radially intermediate portion thereof away from the fixed conical disc 78 and an annular closure plate 79*d* fitted in the projecting end of the cylindrical wall 79*c*.

A fixed piston 81 is fitted in the movable conical disc 79 and has a boss 81*a*, a tapered conical portion 81*b* integral with one end of the boss 81*a* and progressively larger in diameter away from the the boss 81*a*, and an annular flange 81*c* extending radially outwardly from the larger-diameter end of the tapered conical portion 81*b*. The boss 81*a* of the fixed piston 81 is axially movably but nonrotatably fitted over the driven shaft 75. The flange 81*c* is slidably fitted in the cylindrical wall 79*c* of the movable conical disc 79 in a fluidtight fashion. Between the conical disc body 79*b* and the flange 81*c*, there is disposed a coil spring 82 for normally urging the movable conical disc 79 toward the fixed conical disc 78 to reduce the groove width therebetween. The coil spring 82 serves to prevent a belt (described later) from being abruptly loosened when the pressure in a first pressure chamber (described later) happens to leak out.

The conical disc body 79*b*, and the tapered conical portion 81*b* and the flange 81*c* define therebetween a first pressure chamber 83. A second pressure chamber 84 is defined between the closure plate 79*d*, and the tapered conical portion 81*b* and the flange 81*c*. The first and second pressure chambers 83, 84 are held in mutual communication through an orifice 85 defined axially through the boss 81*a* of the fixed piston 81 and a guide tube 86 having inner and outer peripheral surfaces loosely fitted over the outer peripheral surface of the boss 81*a* and in the closure plate 79*d*. The guide tube 86 is fitted over the driven shaft 75 for rotation therewith. The first pressure chamber 83 is also held in communication with a fluid conduit passage 87 defined axially in the driven shaft 75 through a hole 88 defined radially in a peripheral wall of the driven shaft 75.

The driven shaft 75 has a plurality (three in the illustrated embodiment) of through holes $\mathbf{110}_1$ through $\mathbf{110}_3$ defined radially through a peripheral side wall of a substantially axially intermediate portion of the driven shaft 75. The holes $\mathbf{110}_1$ through $\mathbf{110}_3$ are axially spaced at prescribed intervals and provide communication between the interior and exterior of the fluid conduit passage 87. The holes $110_1$ through $110_3$ can be opened and closed by the boss 79a as the movable conical disc 79 is slide axially over the drive shaft 75.

The fluid conduit passage 87 communicates with a fluid inlet 90 through a fluid conduit pipe 89 having opposite ends open. The fluid conduit pipe 89 has one end loosely fitted in the fluid conduit passage 87 and extending toward a substantially axially intermediate position in the fluid conduit passage 87. The other end of the fluid conduit pipe 89 is fitted in a fluidtight manner in a wall portion positioned between the ball bearing 77 and the fluid inlet 90.

The fluid conduit passage 87 has one end portion 87a extending from its substantially axially intermediate position remotely from the fluid inlet 90 and smaller in diameter than the other end portion 87b close to the fluid inlet 90, with a step 87c being positioned between the smaller-diameter end portion 87a and the larger-diameter end portion 87b. The inner ends of the through holes $110_1$ through $110_3$ are open at the inner peripheral surface of the larger-diameter end portion 87b, in which the fluid passage pipe 89 is positioned. A slider 111 is axially movably positioned in the larger-diameter end portion 87b for opening and closing the through holes $110_1$ through $110_3$. The slider 111 comprises a hollow short cylinder having a pressure-bearing surface 112 on one end thereof with the other end open. The slider 111 has a hole 113 defined axially and centrally in the pressure-bearing surface 112. The slider 111 is slidably disposed in the fluid conduit passage 87 in a fluidtight manner.

The slider 111 is normally urged by a coil spring 114 in a direction to close the through holes $110_1$–$110_3$. The coil spring 114 is loosely fitted over the fluid conduit pipe 89 and interposed between the inner end of the slider 111 and a spring seat 115 around the fluid conduit pipe 89.

The fluid inlet 90 is held in communication with a fluid supply passage 91 which connects the control fork chamber 44a to the discharge outlet 29a of the pump 29. The pump 29 has an inlet 29b held in communication via a filter 92 with a fluid tank 93. A return pipe 99 for returning the fluid from the transmission box 30 into the fluid tank 93 extends between a hole 100 defined in one side wall of the transmission box 30 and the fluid tank 93. An endless belt 101 of metal such as steel having a V-shaped cross section is trained around the driver pulley C and the driven pulley D. The rotative power from the driver pulley C is transmitted by the belt 101 to the driven pulley D. By varing the groove widths of the pulleys C, D, the transmission ratio of the belt 101 can continuously be changed.

The inside diameter D1 of the cylindrical wall 34c, or the cylinder diameter of the movable conical disc 34 of the driver pulley C, is selected to be larger than the inside diameter D2 of the cylindrical wall 79c, or the cylinder diameter of the movable conical disc 79 of the driven pulley D.

Operation of the infinitely variable transmission thus constructed is as follows:

(1) Starting of the engine

When the output shaft of the internal combustion engine rotates, the input shaft of the starting clutch 1 is rotated, and so are the input rotatable member 5 and the control mechanism 11. Because the fluid pressure from the pump 29 is not increased and the r.p.m. of the input shaft 2 is below a prescribed level, the governor ball 14 of the control mechanism 11 is not subject to centrifugal forces large enough to overcome the spring 16 engaging the cam plate 13. Therefore, the discharge port 26 of the pressure-regulating valve 10 remains open. The second valve 45 is in the illustrated position in which the port 53 thereof is disconnected from the third port 68 of the driver shaft 4. The first pressure chamber 39 of the driver pulley C is in communication with the second chamber 40 of the driver pulley C through the recesss 73, the annular groove 72, the fourth port 69, the annular groove 52, the fifth port 70, the recess 74, and the guide tube 37. The third valve 46 is also in the illustrated position in which the second port 59 thereof is disconnected from the port 51 of the first valve 43.

The fluid supplied under pressure from the pump 29 flows into the first pressure chamber 83 through the fluid supply passage 91, the inlet 90, the fluid conduit pipe 89, the fluid conduit passage 87, and the hole 88, whereupon the pressure in the fluid conduit passage 87 is increased. The slider 111 in now displaced under the fluid pressure from the illustrated position toward the inlet 90 against the force of the spring 114, thus closing substantially half of the first through hole $110_1$ while opening the second and third through holes $110_2$, $110_3$.

The fluid under pressure from the pump 29 also flows into the pressure chamber 22 of the starting clutch 1 through the fluid supply passage 91, the control fork chamber 44a, the fluid conduit pipe 62, the second valve 45, the first port 58, the third valve 46, the cylindrical bearing body 42, the orifice 48, the first port 49, the annular groove 50, and the supply port 24. Since the pressure-regulating valve 10 has been pressed by the fluid toward the input rotatable member 5 with the discharge port 26 open, the fluid under pressure is discharged from the discharge port 26 into the governor housing 12. Accordingly, there is no pressure buildup in the pressure chamber 22 and the clutch piston 20 does not press the friction plate 21. As the rotative power is not transmitted from the input shaft 2 to the driver shaft 4, the driver pulley C and the driven pulley D are at rest.

Because the port 53 of the second valve 45 is isolated from the third port 68 of the driver shaft 4, no fluid pressure is supplied into the first pressure chamber 39. The movable conical disc 34 is spaced the largest distance from the fixed conical disc 33, so that the groove width of the driver pulley C is maximum as shown.

As described above, the fluid from the pump 29 flows into the first pressure chamber 83 through the fluid supply passage 91, the fluid inlet 90, the fluid conduit pipe 89, the fluid conduit passage 87, and the hole 88. The movable conical disc 79 is therefore urged by the fluid pressure and the spring 82 to displaced most closely to the fixed conical disc 78, with the result the groove width of the driven pulley D is smallest as shown. Therefore, the belt 101 is held in contact with the driver pulley C at its smallest diameter or radially innermost position, and with the driven pulley D at its largest diameter or radially outermost position.

At this time, the slider 111 opens all of the through holes $110_1$–$110_3$, and the movable conical disc 79 of the driven pulley D opens substantially half of the first through hole $110_1$ while closing the second and third through holes $110_2$, $110_3$. Part of the fluid introduced under pressure into the fluid conduit passage 87 is allowed to flow out of the first through hole $110_1$ through the clearance between the inner peripheral surface of the larger-diameter portion **87*b* of the fluid conduit passage 87 and the outer peripheral surface of the fluid conduit pipe 89 for thereby keeping the pressure in the fluid conduit passage 87** at a prescribed level.

(2) Starting of the vehicle

After the engine has started to operate, the accelerator pedal (not shown) is slowly depressed to increase the opening of the throttle valve. When the r.p.m. of the engine is progressively increased and reaches a prescribed level, the governor ball 14 depresses the cam plate awary from the input rotatable member 5 under centrifugal forces against the resiliency of the spring 16. The pressure-regulating valve 10 is then pushed by the cam plate 13 to close the discharge port 26. Therefore, the pressure in the pressure chamber 22 is increased to displace the clutch piston 20 toward the input rotatable member 5 for thereby pressing the friction plate 21 and the clutch facing 27 against the inner end surface of the clutch outer member 19. The rotative power from the input shaft 2 is now transmitted to the driver shaft 4 to rotate the driver pulley C. The rotative power from the driver pulley C is then transmitted by the belt 101 to the driven pulley D, whereupon the driven shaft 75 is rotated to rotate vehicle drive wheels (not shown).

(3) Acceleration

By depressing the accelerator pedal to open the throttle valve further for an increased speed, the engine r.p.m. is increased beyond the prescribed level, whereupon the governor weight 56 is turned counterclockwise to press the second valve 45 toward the starting clutch 1 against the force of the spring 55. The port 53 of the second valve 45 is now brought into communication with the third port 68 of the driver shaft 4, and the communication is cut off between the fourth and fifth ports 69, 70 through the annular groove 52. The fluid under pressure which has introduced into the second valve 45 through the fluid conduit pipe 62 is then allowed to flow into the first pressure chamber 39 through the port 53, the third port 68, the annular groove 72, and the recess 73. The pressure in the first pressure chamber 39 is now raised to move the movable conical disc 34 from the illustrated position towards the fixed conical disc 33 for thereby reducing the groove width of the driver pulley C. The belt 101 is forcibly moved radially outwardly on the driver pulley C. Since the cylinder diameter D1 of the driver pulley C is larger than the cylinder diameter D2 of the driven pulley D, the pressure imposed by the driver pulley C edgeways on the belt 101 is larger than the pressure imposed by the driven pulley D edgeways on the belt 101. Therefore, as the belt 101 is shifted radially outwardly on the driver pulley C, the movable conical disc 79 of the driven pulley D is forced by the belt 101 to move away from the fixed conical disc 78 against the resiliency of the spring 82 and the pressure of the fluid which has been introduced into the first pressure chamber 83 through the inlet 90, the fluid conduit pipe 89, the fluid conduit passage 87, and the hole 88. The belt 101 on the driven pulley D is therefore moved toward the center thereof. The speed of rotation of the driven pulley D is continuously varied from a low level to a medium or high level. More specifically, the medium speed is achieved when the belt 101 is positioned at substantially radially intermediate positions of the driver and driven pulleys C, D (the groove width thereof are intermediate). The highest speed can be attained when the belt 101 running over the driver pulley C is in the radially outermost position (with the largest groove width) and the belt 101 running over the driven pulley D is in the radially inner most position (with the smallest groove width).

As the movable conical disc 49 of the driven pulley C is moved away from the fixed conical disc 78 to achieve the highest speed during acceleration, the movable conical disc 79 successively opens the first, second, and third through holes $110_1$–$110_3$. More specifically, when the fisrt and second through holes $110_1$, $110_2$ are opened, the fluid flows out of the fluid conduit passage 87 through the first and second through holes $110_1$, $110_2$. Thus, the pressure in the fluid conduit passage 87 is lowered, and the slider 111 is displaced away from the fluid inlet 90 under the force of the spring 114 thereby to close the first through hole $110_1$. The fluid under pressure now flows out of the fluid conduit passage 87 only through the second hole $110_2$. Upon continued movement of the movable conical disc 79 away from the fixed conical disc 79, all of the first through third holes $110_1$–$110_3$ are opened to allow the fluid to flow out of the fluid conduit passage 87 through the second and third through holes $110_2$, $110_3$. The pressure in the fluid conduit passage 87 is lowered, and the slider 111 is displaced away from the fluid inlet 90 under the force of the spring 114 thereby to close the first and second through holes $110_1$, $110_2$, whereupon the fluid flows out only through the third through hole $110_3$.

Therefore, when the movable conical disc 79 is shifted away from the fixed conical disc 78, i.e., when the belt 101 is displaced toward a higher-speed or radially inward position on the driven pulley D, the fluid pressure acting on the movable conical disc 79 is kept at a relatively low level.

(4) Deceleration

The process as described above for the acceleration is reversed to move the belt 101 radially inwardly on the driver pulley C and also to move the belt 101 radially outwardly on the driven pulley D.

As the movable conical disc 79 of the driven pulley D is moved toward the fixed conical disc 78 thereof to reach the lowest speed during deceleration, the movable conical disc 79 successively closes the first, second, and third through holes $110_1$–$110_3$. More specifically, when the third through hole $110_3$ is closed, the fluid which has been discharged out of the fluid conduit passage 87 through the third through hole $110_3$ is prevented from flowing out (the second and third through holes $110_2$, $110_3$ are closed by the slider 111). The pressure in the fluid conduit passage 87 is increased, and the slider 110 is moved toward the fluid inlet 90 against the force of the spring 114 to open the second through hole $110_2$, through which the fluid flows out of the fluid conduit passage 87. As the movable conical disc 79 is further moved toward the fixed conical disc 78, the movable conical disc 79 closes the third and second through holes $110_3$, $110_2$. The fluid which has been discharged out of the fluid conduit passage 87 through the second through hole $110_2$ is prevented from flowing out (the third through hole $110_3$ is closed by the movable conical disc 79 and the first through hole $110_1$ is closed by the slider 111). The pressure in the fluid conduit passage 87 is therefore further increased, and the slider 111 is moved toward the fluid inlet 90 against the force of the spring 114, thereby opening the first through hole $110_1$, through which the fluid flows out of the fluid conduit passage 87.

Consequently, when the movable conical disc 79 is displaced toward the fixed conical disc 78, i.e., when the belt 101 is displaced toward a lower-speed or radially outward position on the driven pulley D, the fluid pressure acting on the movable conical disc 79 is kept at a relatively high level.

(5) Quick acceleration (kickdown)

When the accelerator pedal is slowly depressed to increase the opening of the throttle valve under normal condition, the accelerator-controlled fork 63 is turned clockwise in response to the depression of the accelerator pedal. The third valve 46 is slightly moved by the rod 60 from the illustrated position downwardly (FIG. 1) away from the starting clutch 1. The second port 59 is then brought into slight communication with the port 51 to allow a small amount of fluid under pressure to flow from the third valve 46 through the ports 59, 51 into the pressure chamber 43*a*. Upon supply of the fluid into the pressure chamber 43*a*, the first valve 43 is moved away from the starting clutch 1 to cut off the communication between the port 51 and the second port 59. The first valve 43 is then stopped. The resilient force of the spring 55 is now increased to limit the governor action through the governor weight 56.

When the accelerator pedal is released to reduce the opening of the throttle valve, the accelerator-controlled fork 63 is returned to the original position to allow the port 51 and the annular groove 59*a* to communicate slightly with each other. The fluid under pressure is then discharged from the pressure chamber 43*a* through the port 51, the annular groove 59*a*, the clearance between the third valve 46 and the driver shaft 4, and the second port 67 into the transmission box 30. Upon discharge of the fluid from the pressure chamber 43*a*, the first valve 43 is moved upwardly (FIG. 1) toward the starting clutch 1 to cut off the communication between the port 51 and the annular groove 59*a*.

The foregoing action or movements do not have substantial effects on the motion of the governor.

When the accelerator pedal is abruptly depressed to increase the throttle valve opening quickly, the third valve 46 is moved a large distance away from the starting clutch 1 to permit the second port 59 and the port 51 to communicate widely. Therefore, a large amount of fluid is supplied into the pressure chamber 43*a* to cause the first valve 43 to move a large distance away from the starting clutch 1. The balancing between the pressure in the pressure chamber 43*a* and the spring 55 is greatly lost to influence the governor motion, such that the governor weight 56 is turned back clockwise, resulting in deceleration. The foregoing action is made possible by suitably selecting the relationship between the degree of communication between the ports 51, 59 and the governor balancing and the resiliency of the spring 55 at a design level.

Upon deceleration, the fluid is discharged into the second chamber 40 of the driver pulley C and pooled on the radially outer portion of the second chamber 40 under centrifugal forces. The pooled fluid serves to counteract the force acting on the flange 36*b* of the fixed piston 36 from the first pressure chamber 39, thus uniformizing the loads imposed by centrifucal forces on the opposite sides of the flange 36*b*. The fluid under pressure flows from the first pressure chamber 83 of the driven pulley D through the orifice 85 into the second pressure chamber 84 in which the fluid is pooled in the radially outer portion thereof. The pooled fluid also serves to uniformize the loads imposed by centrifugal forces on the opposite sides of the flange 81*c* of the fixed piston 81.

Since the fluid under pressure is discharged from the first pressure chamber 39 into the second pressure chamber 40, the first and second valves 43, 45 are returned to their original position under the combined forces of the spring 55 and the governor weight 56. The fluid is then prevented from being discharged from the first pressure chamber 39 into the second pressure chamber 40, so that excessive deceleration can be avoided. The movement of the first valve 43 away from the starting clutch 1 is limited by engagement of the stopper abutment 54 with the stopper 66. as a consequence, the kickdown range can be determined by the clearance between the stopper abutment 54 and the stopper 66.

In the above embodiment, the slider 111 is disposed in the driven shaft 75 having the through holes $110_1$–$110_3$, and the movable conical disc 79 doubles as a member for opening and closing the through holes $110_1$–$110_3$. Therefore, the number of parts required is small, the arrangement is compact, and the cost of manufacture is lowered. The fact that no regulator is necessary for the pump also accounts for such a lowered cost. Since the through holes $110_1$–$110_3$ are defined in the driven shaft 75, the fluid, if it is oil, can be supplied from the through holes $110_1$–$110_3$ as lubricating oil to the belt 101. No special mechanism for supplying lubricating oil to the belt 101 is required. This also simplifies and reduces the cost of the overall structure.

While in the aforesaid embodiment the directional control valve mechanism (fluid metering mechanism) 41 is incorporated in the driver side, the mechanism 41 may be assembled in the driven side so that the r.p.m. of the output shaft will remain unchanged even when the r.p.m. of the input shaft is changed. With such a modification, the present invention is applicable to a device which is driven at a constant speed of rotation such as by a generator or an oil pump. The pressure regulating mechanism 94 may be incorporated in the driver side, rather than the driven side.

Figure 2:
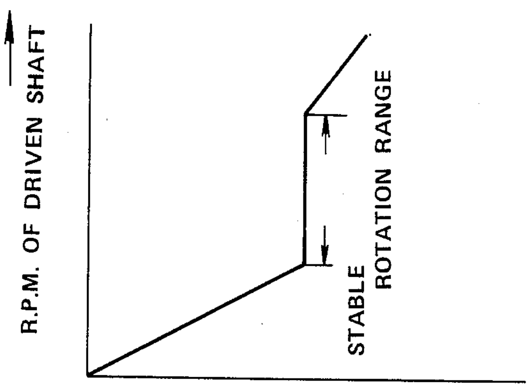
FIG. 2 is a graph showing the relationship between the r.p.m. of a driver shaft and the r.p.m. of a driven shaft in the infinitely variable transmission.

FIG. 2 is a graph showing the relationship between the r.p.m. of the driver shaft and the r.p.m. of the driven shaft while the throttle valve opening remains constant. The illustrated range of stable rotation is laterally shifted as the throttle valve opening varies. If the driver mechanism and the driven mechanism were switched around, then the r.p.m. of the driven shaft would remain constant even when the r.p.m. of the driver shaft would be varied. The arrangement could therefore be assembled in a device driven at a constant r.p.m. as by a generator or an oil pump. Since the r.p.m. in the range of stable rotation (with the r.p.m. of the driver shaft and the r.p.m. of the driven shaft being switched around) would be changed and set up continuously, the arrangement could be utilized in an alternating generator, for example, which can generate both 50 Hz and 60 Hz, selectively.

Figure 3:
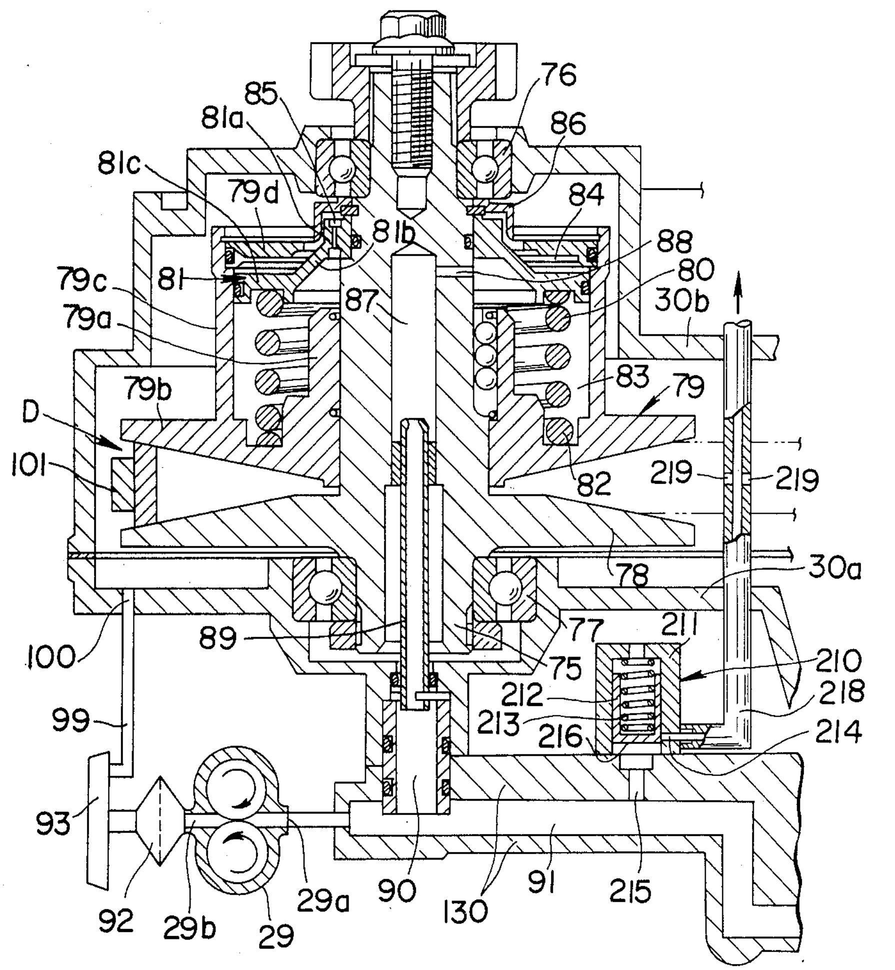
FIG. 3 is a cross-sectional view of an infinitely variable transmission according to a second embodiment of the present invention.

FIG. 3 illustrates an infinitely variable transmission according to a second embodiment in which a pressure regulating mechanism is disposed in the transmission box 30 between the driver pulley and the driven pulley. Those parts in FIG. 3 which are identical to those shown in FIG. 1 are denoted at identical reference characters in FIG. 1.

A fluid pressure regulator 210 for keeping the pressure in the infinitely variable transmission 3 at a prescribed level is connected to the fluid supply passage 91 and fixed to the inner surface of an outer wall 130 of the transmission box 30, the fluid pressure regulator 210 being positioned between the outer wall 130 and a side wall 30*a* of the transmission box 30. The fluid pressure regulator 210 is composed of a hollow cylindrical housing 211, a hollow cylindrical valve 212 slidably disposed therein, and a resilient member comprising a return spring 213 for normally urging the valve 212 into a closed position. The housing 211 has one end open and a port 214 defined through a peripheral wall adjacent to the open end. The open end of the housing 211 is secured to the inner surface of the outer wall 130. The interior of the housing 211 is held in communication with the fluid supply passage 91 through a hole 215 defined through the outer wall 130. The valve 212 has one open end and an opposite closed end facing the hole 215, and is axially slidably fitted in the housing 211 in a fluidtight manner for opening and closing the port 214. The closed end of the valve 212 serves as a pressure-bearing surface 216.

The return spring 213 is in the form of a coil spring loosely fitted in the valve 212 and interposed between the inner end face of the valve 212 and the inner end face of the housing 211.

To the port 214, there is connected one end of a fluid feed pipe 218 with its opposite end extending through a side wall 30*b* of the transmission box 30 and connected to the fluid tank 93. The fluid feed pipe 218 is positioned within the transmission box 30 between opposite straight runs of the belt 101. The fluid feed pipe 218 has two feed holes 219 positioned in alignment with the belt 101 for feeding the fluid such as oil to the belt 101.

When the pressure of the fluid supplied through the fluid supply passage 91 is in excess of a prescribed level, the valve 212 is displaced against the force of the spring 213 to bring the port 214 and the hole 215 into mutual communication. When the pressure of the fluid supplied through the fluid supply passage 91 is below the prescribed level, the valve 212 disconnects the port 214 from the hole 215.

The fluid pressure regulator 210 operates in substantially the same manner as that of the pressure regulating mechanism 94 according to the first embodiment. Therefore, the ability of the fluid pressure regulator 210 to feed the fluid as lubricating oil to the belt 101 will mainly be described hereinbelow.

When the fluid pressure from the pump 29 exceeds the prescribed level, it acts on the pressure-bearing surface 216 through the hole 215 to force the valve 212 in the opening direction against the resiliency of the spring 213. The port 214 and the hole 215 are now brought into communication with each other to discharge any excess fluid pressure from the fluid supply passage 91 through the hole 215, the port 214, and the fluid feed pipe 218 into the fluid tank 93 which is a lower-pressure area. At this time, part of the fluid in the fluid feed pipe 218 is supplied as lubricating oil to the belt 101 through the feed holes 219. When the fluid pressure from the pump 29 returns to the prescribed level, the valve 212 is moved in the closing position by the spring 213 to cut off the communication between the port 214 and the hole 125.

When the accelerator pedal is released to reduce the opening of the throttle valve, the fluid under pressure is discharged from the pressure chamber 43*a* through the second port 67 into the transmission box 30. Part of the fluid discharged from the pressure chamber 43*a* into the transmission box 30 is caught by the belt 101 to lubricate the same.

Therefore, when the fluid pressure from the pump 29 exceeds the prescribed level while the vehicle is running, part of the excess fluid discharged from the fluid pressure regulator 210 is supplied as lubricating oil to the belt 101. Whe the opening of throttle valve is reduced by releasing the accelerator pedal, the fluid discharged through the second port 67 is supplied as lubricating oil to the belt 101.

In the embodiment of FIG. 3, the opposite end of the fluid feed pipe 218 extends through the side wall 30*b* of the transmission box 30 for directly returning the fluid to the fluid tank 93. However, all of the fluid discharged from the fluid pressure regulator 210 through its port 214 may be discharged into the transmission box 30 which is a lower-pressure area to lubricate the belt 101, and thereafter the fluid having dropped from the belt 101 onto the bottom of the transmission box 30 may be returned through the pipe 99 to the fluid tank 29.

Since the fluid discharged from the fluid pressure regulator is utilized as lubricating oil, the pump 29 as the fluid pressure supply source is not required to bear an excessive load. The illustrated lubricating arrangement is especially useful when the engine rotates at a high r.p.m. since the amount of fluid discharged from the pump is large and an increased amount of lubricating oil has to be supplied to the belt.

The positions where the fixed conical discs 33, 78 of the driver and driven pulleys C, D are fixed will be described below.

Figure 4:
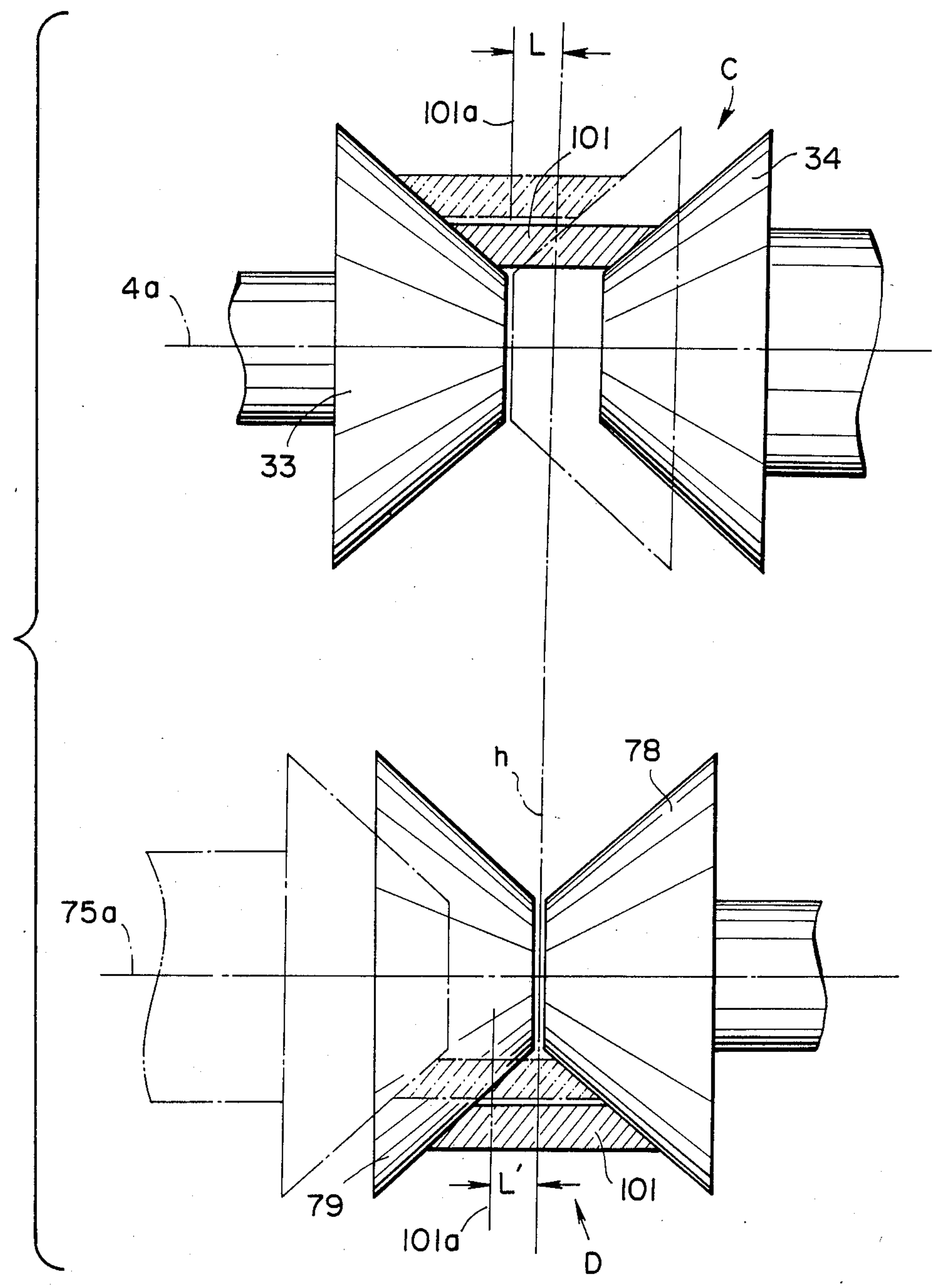
FIG. 4 is a fragmentary view showing the manner in which an endless belt is shifted as pulley conical discs are axially moved.

FIG. 4 schematically shows the driver pulley C and the driven pulley D. The fixed conical discs 33, 78 have their conical taper surfaces confronting those of the movable conical discs 34, 79, respectively. The fixed conical discs 33, 78 are positioned on opposite sides of the endless belt 101, and the movable conical discs 34, 79 are movable toward and away from fixed conical discs 33, 78 in the axial direction of the pulleys C, D.

When the movable conical discs 34, 79 are positioned as indicated by the solid lines in FIG. 4, the diameter of the driver pulley C is small, and the diameter of the driven pulley D is large, resulting in a low transmission ratio. When movable conical discs 34, 79 are positioned as indicated by the imaginary lines in FIG. 4, the diameter of the driver pulley C is large, and the diameter of the driven pulley D is small, resulting in a high transmission ratio. As the pulley diameters vary between the low and high transmission ratios, the central axis of the endless belt 101 is shifted from a line h normal to pulley axes 4*a*, 75*a* by L on the driver pulley C in the axial direction thereof and by L' on the driven pulley D in the axial direction thereof.

Figure 8:
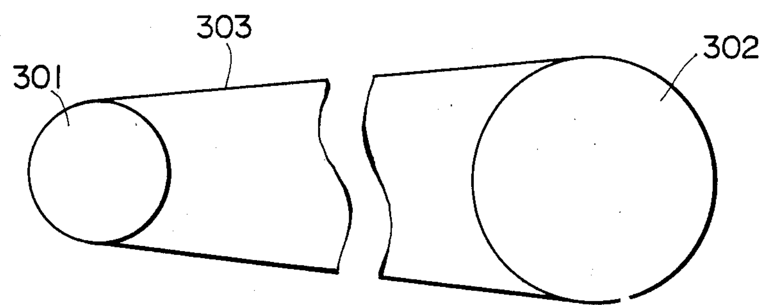
FIGS. 8(A) and 8(B) are views illustrative of the manner in which the diameters of the driver and driven pulleys are varied when the transmission ratio has been changed.
Figure 8:
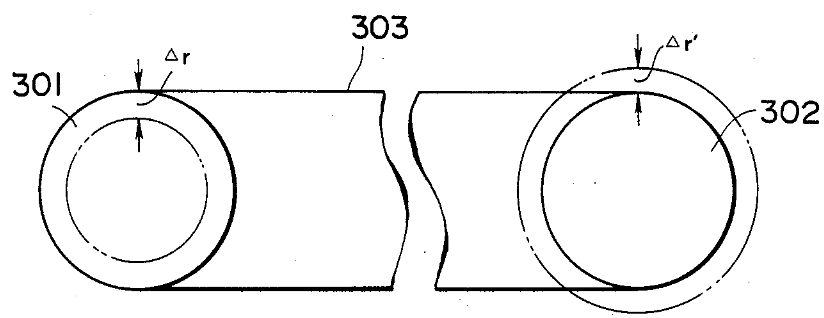

Heretofore, the endless belt has been positioned such that its deviation from the line normal to the pulley axes at the low transmission ratio is substantially nil, and hence the belt has been subject to localized wear for the following reasons:

In FIG. 8(A), a driver pulley 301 is of a small diameter and a driven pulley 302 is of a large diameter for a low transmission ratio. In FIG. 8(B), the ratio between the diameters of the driver and driven pulleys 301, 302 is 1:1 for a higher speed ratio (medium speed range) than that of the diameter ratio shown in FIG. 8(A). When the pulley diameter is varied from FIG. 8(A) to FIG. 8(B), the radius of the driver pulley 301 is increased $\Delta r$ and the radius of the driven pulley 302 is reduced $\Delta r'$. Since the entire length of the endless belt 303 is constant, the diameter changes should meet the relationship $\Delta r > \Delta r'$ in order to be able to transmit power under a prescribed degree of tension.

Figure 10:
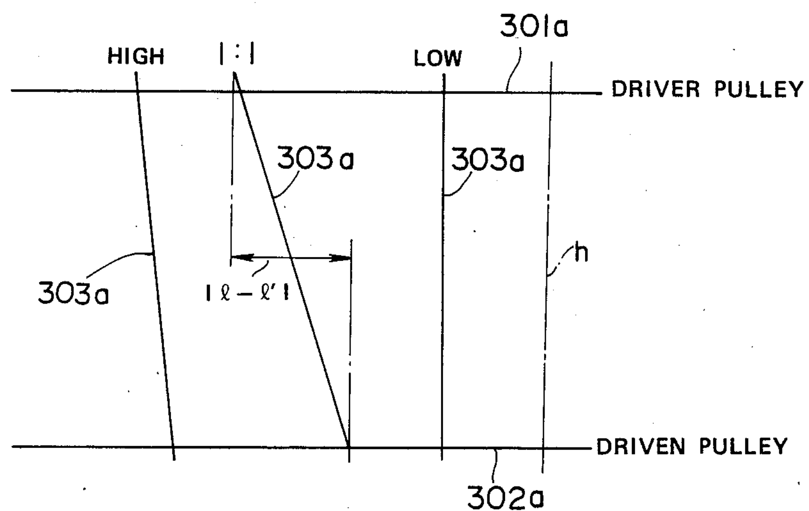
FIG. 10 is a graph illustrating the relationship between the transmission ratio and the inclination of the endless belt in a conventional infinitely variable transmission.
Figure 9:
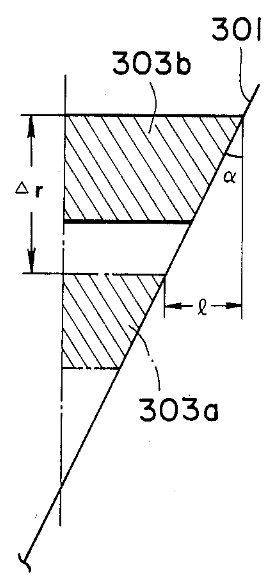
FIGS. 9(A) and 9(B) are views showing different distances that the endless belt moves on the driver and driven pulleys, respectively.
Figure 9:
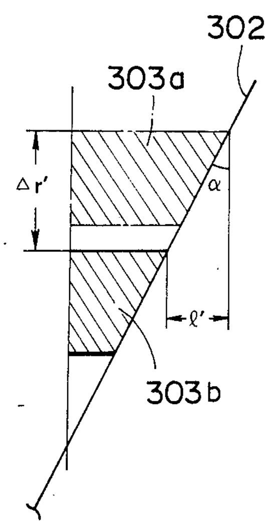

FIGS. 9(A) and 9(B) are cross-sectional views showing the relationship between the endless belt 303 and the pulleys 301, 302 as their diameters vary as described above. Denoted at $\alpha$ is the angle of inclination of the conical surfaces of the conical discs, 303*a* is the position of the endless belt before the pulley diameters are varied, and 303*b* is the position of the endless belt after the pulley diameters are varied. The distance l that the endless belt is moved on the driver pulley 301 in the axial direction thereof is indicated by $l = \Delta r \tan \alpha$, and the distance l' that the endless belt is moved on the driven pulley 302 in the axial direction thereof is indicated by $l' = \Delta r' \tan \alpha$. Since $\Delta r > \Delta r'$, the distance l is larger than the distance $l' (l > l')$. Therefore, as shown in FIG. 10, the central axis of the endless belt is deviated $|l - l'|$ from the central line h normal to the pulley axes 301*a*, 302*a* when the speed ratio is intermediate at about 1:1.

As a result, when the speed ratio is frequently varied between the high and low ratios, the belt of metal which is of high transverse rigidity is subject to undue forces tending to shorten the service life of the belt.

Figure 5:
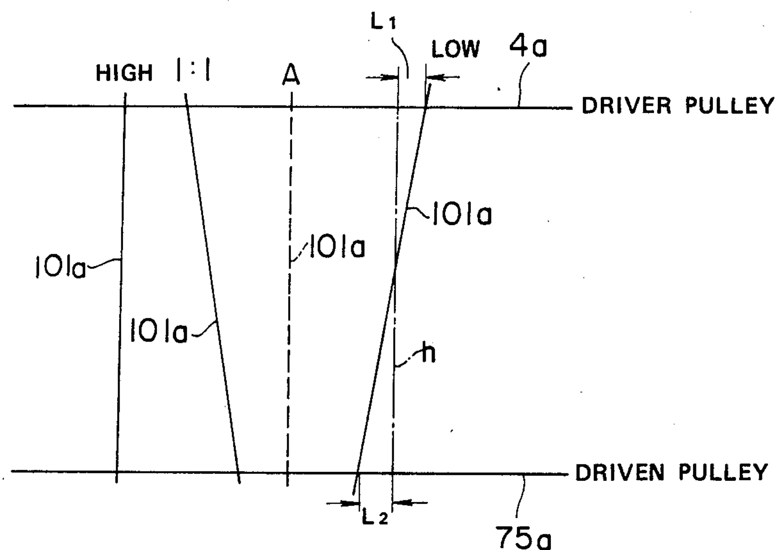
FIG. 5 is a graph illustrating the relationship between the transmission ratio and the inclination of the endless belt.

According to the present invention, the fixed conical discs 33, 78 are displaced or offset in advance in the directions of the axes 4*a*, 75*a* of the pulleys C, D. The distance L1, L2 by which the fixed conical discs 33, 78 are axially offset are selected to be about $\frac{1}{2}$ of the maximum deviation L of the conventional endless belt. More specifically, the fixed conical disc 33 is offset about $\frac{1}{2}\Delta L$ to the right from the line h (FIG. 5) at the low speed ratio, and the fixed conical disc 78 is offset about $\frac{1}{2}\Delta L'$ to the left from the line h at the low speed ratio. As a result, the endless belt 101 is inclined at the low speed ratio such that the central axis 101*a* thereof is tilted at about half of the maximum angle of inclination of the conventional endless belt. The distances L1, L2 that the fixed conical discs 33, 78 are offset in the directions of the pulley axes 4*a*, 75*a* are selected such that the deviation of the central axis 101*a* of the endless belt 101 from the line h normal to the pulley axes 4*a*, 75*a* is substantially zero at a speed ratio A (ranging from the starting or low-speed range to the high-speed range) which is most frequently used between the lowest speed ratio and the speed ratio of about 1:1.

Figure 7:
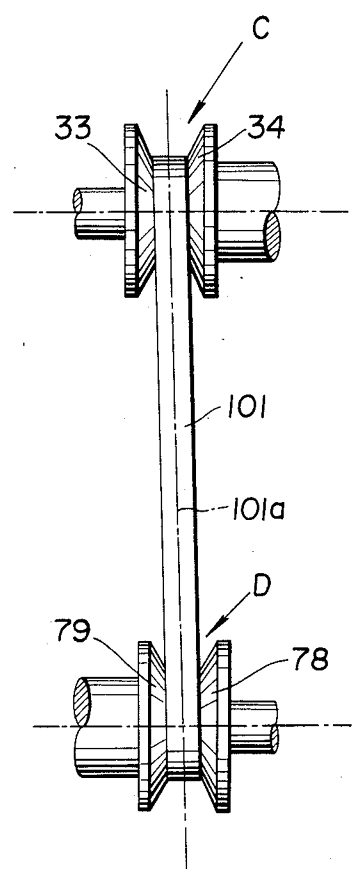
FIGS. 6 and 7 are views of the endless belt as it is inclined at low and high transmission ratios, respectively.
Figure 6:
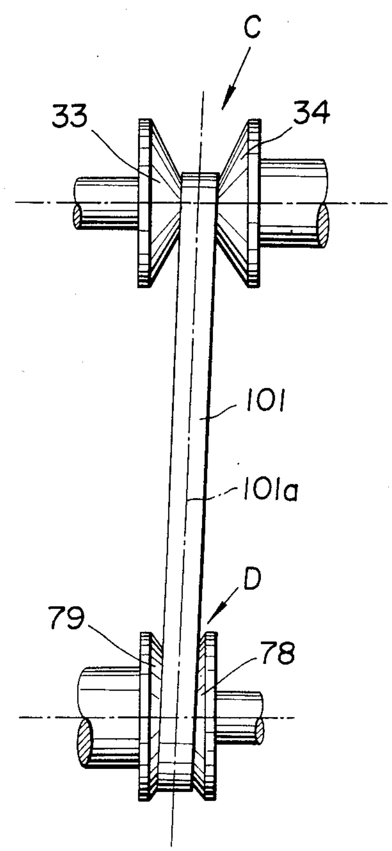

FIGS. 6 and 7 show the endless belt 101 trained around the drive pulley C and the driven pulley D which are arranged as described above. In FIG. 6, the drive and driven pulleys C, D are positioned for the lowest speed ratio, with the endless belt 101 being tilted to the right. In FIG. 7, the drive and driven pulleys C, D are positioned for the speed ratio of about 1:1, with the endless belt 101 being tilted to the left.

As a consequence, the endless belt 101 will be tilted in opposite directions as the power transmission speed ratio is varied between the low and high ratios across the speed ratio A which is most frequently used. The endless belt 101 is therefore prevented from suffering localized wear, but can uniformly be worn as the speed ratio varies, with the result that the service life of the endless belt 101 can largely be increased.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. An infinitely variable transmission comprising:

a driver shaft drivable by a source;

a driven shaft drivable by power transmitted from said driver shaft;

driver and driven pulleys mounted respectively on said driver and driven shafts;

each of said driver and driven pulleys comprising a fixed conical disc fixed to one of said driver and driven shafts and a movable conical disc mounted axially slidably on said one of said driver and driven shafts, said fixed and movable conical discs jointly defining a V-shaped groove, said movable conical disc having a pressure chamber therebehind which has a volume variable under a fluid pressure for moving the movable conical disc;

an endless belt trained around said driver and driven pulleys and engaging in the V-shaped grooves;

means for supplying a fluid under pressure to said pressure chamber;

a pressure regulating mechanism for regulating the fluid pressure at a prescribed pressure;

a fluid metering mechanism for regulating the amount of the fluid under said prescribed pressure in said pressure chamber; and at least one of said pressure regulating mechanism and said fluid metering mechanism being disposed in one of said driver and driven shafts.

2. An infinitely variable transmission according to claim 1, wherein said fluid metering mechanism is disposed in said driver shaft.

3. An infinitely variable transmission according to claim 1, wherein said pressure regulating mechanism is disposed in said driven shaft.

4. An infinitely variable transmission according to claim 2, wherein said endless belt is made of metal, said fluid being oil, and said pressure regulating mechanism having means for discharging an excess amount of the fluid to a lower-pressure area when the supplied fluid pressure exceeds a prescribed level and also having a passage for supplying the discharged amount of the fluid as lubricating oil to said endless belt.

5. An infinitely variable transmission according to claim 3, wherein said endless belt is made of metal, said fluid being oil, and said pressure regulating mechanism having means for discharging an excess amount of the fluid to a lower-pressure area when the supplied fluid pressure exceeds a prescribed level and also having a passage for supplying the discharged amount of the fluid as lubricating oil to said endless belt.

6. An infinitely variable transmission comprising:

a driver pulley drivable by a drive source;

a driven pulley drivable by power transmitted from said driver pulley;

an endless belt trained around said driver and driven pulleys;

each of said driver and driven pulleys comprising a rotatable shaft, a fixed conical disc fixed to said rotatable shaft, and a movable conical disc mounted axially slidably on said movable shaft for varying the power transmission speed ratio of said endless belt running over said driver and driven pulleys, the fixed conical discs of said driver and driven pulleys being disposed on opposite sides of said endless belt and arranged such that the central axis of said endless belt is inclined with respect to a line normal to said rotatable shaft at an angle which is substantially zero at a power transmission speed ratio which is most frequently be used between said driver and driven pulleys.

7. An infinitely variable transmission according to claim 6, wherein said fixed conical disc is arranged to tilt the central axis of said endless belt, when the power transmission speed ratio is low, with respect to said line normal to said rotatable shaft at an angle which is about $\frac{1}{2}$ of the maximum angle of inclination of the central axis of said endless belt which would be reached by varying said power transmission speed ratio if the fixed conical disc would be positioned to substantially eliminate the inclination of the central axis of said endless belt with respect to said line when said power transmission speed ratio would be low.

* * * * *